Patented Oct. 19, 1948

2,452,021

UNITED STATES PATENT OFFICE 2,452,021

TREATMENT OF DRILLING FLUIDS

Truman B. Wayne, Houston, Tex.

No Drawing. Application June 5, 1939,
Serial No. 277,564

12 Claims. (Cl. 252—8.5)

This invention relates generally to the treatment of mud-laden or drilling fluids, and particularly to the treatment of such fluids as are employed in the rotary drilling of oil and gas wells so as to improve the physical properties of said fluids. As to common subject matter, this application is a continuation in part of my prior copending application, Serial No. 24,083, filed May 29, 1935, which disclosed reagents for the degelling of well drilling fluids by the use of acids and salts derived from the class comprising suitable degelling agents.

The fluid employed for rotary drilling operations and which is also called a "drilling mud" and a "mud-laden fluid," may be made from the natural clay which occurs at the location or may be synthetically compounded from the clay and mud bases of commerce, including bentonite and beidellite. Such a fluid therefore contains a gel-forming constituent which is generally bentonitic in its nature. Such a fluid has viscosity and thixotropic properties. Such fluids may also contain a heavy substance such as barytes, iron oxide, or the like, for increasing the specific gravity of the fluid. Such a fluid is herein designated descriptively, as an "aqueous well drilling fluid."

Such fluids as are synthetically compounded may be controlled as to viscosity by a proper variation of the colloidal or gel-forming content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult. Furthermore, it is sometimes desirable to reduce the viscosity of drilling fluids initially.

It is an object of the present invention, generally stated, to provide a process and composition for the treatment or degelling of mud-laden or drilling fluids for wells in order to control the viscosity and thixotropic properties thereof.

Another object of the invention is to provide a process and composition for treating such fluids for wells whereby the properties of the hydrated clay colloids are modified and the viscosity of the fluid reduced.

A further object of the invention is to provide an aqueous mud-laden or drilling fluid for wells and the process of making it in which the properties of the colloidal or gel-forming matter in the fluid are substantially modified and rendered suitable for rotary drilling purposes.

A more specific object of this invention is to provide an agent for the treatment of mud-laden or drilling fluids, selected from a class of chemical reagents, a process of treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the properties of the colloidal or gel-forming matter in the fluid. More specifically, in accordance with the present invention, a degelling action on the mud-laden or drilling fluid is produced by a class of degelling chemical substances which may be generally described as a poly-derivative of at least one water-soluble derivative of a normally solid acidic oxide as herein defined, of an element of one of the groups III, IV, V, and VI of the periodic system of elements. This may be accomplished by treatment with chemicals so selected that the reaction which accomplishes the change of colloidal properties is irreversible, and, furthermore, by the use of appropriate acids, salts, or the acid-forming oxides, themselves, which have been selected from the various groups comprising the periodic system. A number of chemical substances derivable from elements in groups II to VIII, inclusive, of the periodic system suitable for my purpose are hereafter enumerated, but it will be understood that other suitable substances are contemplated.

In my copending application, Serial No. 24,083, there were disclosed a limited number of members of groups III, IV, and V. These comprise the oxy-acids and oxy-acid salts of boron, silicon, and phosphorus, respectively. The present invention is a continuation and extension of the above-mentioned application to include other members of these same groups, together with the members of group VI, some of which are suitable degelling agents.

In the following table are given members of the various groups, together with their highest state of oxidation in the form of suitable acid-forming oxides, which possess degelling properties. The terms $M_2O_3$, $MO_2$, $M_2O_5$, $MO_3$, refer to the normally solid acidic oxides of the elements M; and by "normally solid" oxides I mean those oxides which remain solid at temperatures in excess of 100° C. M is an element of one of the groups III, IV, V and VI of the periodic system. For instance, $P_2O_5$ is an acid-forming oxide of phosphorus, which is included under group V. Phosphorus also has lower oxide forms such as $M_2O_3$, $MO_2$ (as $P_4O_6$ and $P_2O_4$, respectively), but only the highest form of oxide is given in the following table.

TABLE I

Elements arranged according to the periodic system whose acid-forming oxides possess degelling properties

| Group III ($M_2O_3$) | Group IV ($MO_2$) | Group V ($M_2O_5$) | Group VI ($MO_3$) |
| --- | --- | --- | --- |
| Boron | Silicon Titanium Zirconium Tin | Phosphorus Vanadium Arsenic Columbium Antimony Tantalum | Chromium Molybdenum Tungsten Uranium |

There are considerable variations in the properties of the acid-forming oxides of metals or elements selected from any one group, and the efficiency of such compounds as degelling agents is influenced by such variations. While no hard and fast rule may be offered, it appears that acids and salts derived from acid-forming oxides of boron, phosphorus, vandium and arsenic are usually to be preferred. However, salts of acids derived from relatively insoluble acid-forming oxides, such as the crystalline silicates derived from silica, are of value for my purpose. Economic considerations also favor the general use of suitable compounds of boron, silicon, phosphorus, and arsenic as commercially practicable degelling agents.

Suitable degelling agents may be selected from the oxy-acid derivatives of various elements listed in Table I. Their use in accordance with the present invention contemplates the treatment of drilling fluids so as to accomplish a reduction in the degree of hydration or hydration capacity of the gel-forming colloid fraction of the clay or bentonite. This action has been descriptively referred to herein, and also in my copending application, Serial No. 24,083, as a "degelling" action.

Many of the oxy-acids derived from the acid-forming oxides of elements shown in Table I exist in the ortho, meta, and pyro forms, depending upon the degree of hydration of the acidic oxide, or, conversely, on the degree of dehydration if prepared from an ortho acid or salt. In addition to these various forms, it is contemplated that polymeric forms prepared by heating the acids or acid salts are useful in my process. Amorphous "glasses" prepared by fusion and/or dehydration of acid salts are highly suitable for my purpose. The various polyphosphates are the best known substances belonging to this class, but various others derivable from acid arsenate, borate, vanadate, molybdate and other salts are also useful. In the majority of cases these polycompounds are to be preferred over the simpler oxy-acids, acid salts, and normal salts.

Various complexes containing more than one of the above mentioned elements in their molecular structure are also highly desirable reagents. For instance, boro-phosphates, phospho-vanadates, phospho-tungstates, phospho-molybdates, silico-phosphates, and the like, may be prepared by fusion of a mixture of two or more oxy-acids or acid salts having one or two acid valences, in a manner analogous to the preparation of polyphosphates, etc.

In referring to salts herein, it is to be understood that compounds wherein an ester radical appears are to be considered as within the meaning of this term. For instance, ethyl ammonium phosphate is a salt within the meaning of this term. Any suitable compound containing a reactive phosphate, borate, silicate, arsenate, vanadate or other reactive radical wherein an element or elements from Table I is present as an oxygen-containing anion, is considered as belonging to the general class of derivatives of an acid-forming oxide contemplated herein.

These oxy-acids, acid salts, normal salts, polyacids, poly-salts, soluble "glasses," and mixed poly-compounds containing more than one element from the group shown in Table I, may be used alone in the treatment of well drilling fluids, or may be used together with an organic hydrophile substance such as natural or synthetic tannins, soluble gums, starches, sugars, organic sulfonic acids, acidic dyestuffs, or other peptizing material, all of which may be classed as lyophile colloids. Furthermore, the alkali hydroxides and carbonates as well as other alkali materials may be used in connection therewith.

The colloidal fractions of bentonite, as well as those of various clays obtained from widely different locations, are quite similar in their composition with respect to silica, alumina, and iron, the main deviation only being from 10 to 15 per cent of the average of each of these substances. The differences in properties exhibited by mud-laden or drilling fluids prepared from clays and clayey materials obtained from various sources are largely due to varying proportions of calcium and/or magesium present in the colloidal fraction and to the larger proportion of non-colloidal inert material contained in the same clayey suspension. In all cases these gel substances are complex hydrous silicates containing considerable proportions of aluminum and, in fact, may be classed either as hydrous alumino-silicates or in some instances hydrous silico-aluminates. Such substances invariably contain appreciable quantities of calcium and/or magnesium in their composition and it has been observed that the corresponding sodium or potassium compound does not possess the same degree of gelatinous properties and the accompanying high viscosity that is associated with the corresponding alkaline-earth bearing hydrous silicates.

In order to illustrate the principles of my invention, a number of specific examples are hereinafter given. However, it should be distinctly understood that I do not confine myself to the specific treating agents, drilling fluid compositions, or proportions hereinafter disclosed, as it should be understood by those skilled in the art that variations from these disclosures do not depart from the principles and spirit of my invention which is directed in a general way to the use of derivatives of acidic oxides in the degelling and controlling of the viscosity of mud-laden or rotary drilling fluids.

The tests described in the following examples were conducted on well drilling fluids prepared largely from Wyoming bentonites and water so as to have a maximum content of the hydrous aluminum silicates which are reacted upon in the manner herein described. Drilling fluids prepared from natural clays and shales usually encountered during drilling operations are similarly acted upon, since in all case the colloidal fractions of such materials are quite similar in composition and properties to the purer colloidal gel-forming material, bentonite.

The following examples typify the use of oxy-acid derivatives of the acidic oxides of one or more elements of groups III to VI. Such examples are intended to set forth the use of derivatives of the most suitable element or elements from the standpoints of efficiency, economy, and ease of handling. No attempt is made to illustrate the use of all members of each group appearing in Table I, particularly those of rare elements such as titanium, zirconium, columbium, and the like, as aside from their scarcity and high cost, the solubility of their acidic oxides is limited and their corresponding derivatives are therefore more difficult to work with in a practicable manner.

EXAMPLE 1

As specific examples of the use of an element belonging to group III, the compounds belonging to the general class comprising the oxy-acids of boron are useful. In Table II are given data obtained from the treatment of a drilling fluid prepared by dispersing Wyoming bentonite in the proportion of 8 per cent by weight in boiling water and stirring in a high speed mixer until hydration was complete. Drilling fluids so prepared are partially coagulated and highly viscous. In all cases aqueous solutions of the treating agents were added to 200 ml. samples of the drilling fluid in the proportions specified, agitated thoroughly, and then tested in a Stormer viscosimeter at 600 R. P. M. and at a temperature of 20° C.

TABLE II

| Proportion (Grams per 100 ml.) | Viscosity in Centipoises | | |
|---|---|---|---|
| | Sodium Dimetaborate $(Na_2B_2O_4.4H_2O)$ | Sodium Tetraborate $(Na_2B_4O_7.10H_2O)$ | Sodium Pentaborate $(NaH_2B_5O_9.4H_2O)$ |
| None (Untreated Fluid) | 51 | 51 | 51 |
| 0.05 | 39 | 42 | 38 |
| 0.10 | 35 | 39 | 33 |
| 0.20 | 33 | 33 | 29 |
| 0.40 | 33 | 29 | 25 |

EXAMPLE 2

The various borates are considerably more effective in the presence of a lyophile colloid. In Table III are given the results of adding various proportions of dry chestnut extract to samples of the drilling fluid used in Example 1 which were also treated with the various borates in the proportion of 0.40 g. of borate salt per 100/ml. of original drilling fluid.

TABLE III

| Chestnut Extract (Grams per 100 ml.) | Viscosity in Centipoises | | |
|---|---|---|---|
| | Sodium Dimetaborate $(Na_2B_2O_4.4H_2O)$ | Sodium Tetraborate $(Na_2B_4O_7.10H_2O)$ | Sodium Pentaborate $(NaH_2B_5O_9.4H_2O)$ |
| None (Borate only) | 33 | 29 | 25 |
| 0.10 | 25 | 25 | 22 |
| 0.20 | 22 | 22 | 21 |
| 0.40 | 19 | 19 | 19 |

EXAMPLE 3

The soluble crystalline silicates are the most representative members of group IV. They produce rapid degelling effects, particularly in low concentrations.

The following soluble silicates, representing the truly crystalline salts, were used in the treatment of a drilling fluid prepared from Wyoming bentonite and water at atmospheric temperature (20° C.), and containing 8 per cent of bentonite by weight. The results are given in Table IV.

TABLE IV

| Proportion (Grams per 100 ml) | Viscosity in Centipoises | |
|---|---|---|
| | Sodium Metasilicate Anhyd. $(Na_2SiO_3)$ | Sodium Orthosilicate Anhyd. $(Na_2SiO_4)$ |
| None (Untreated Fluid) | 34 | 34 |
| 0.02 | 23 | 23 |
| 0.05 | 22 | 22 |
| 0.10 | 22 | 25 |
| 0.20 | 22 | 34 |

EXAMPLE 4

As another illustrative example, 50 parts of caustic soda, 50 parts of sodium silicate, and 75 parts (by weight) of dry quebracho extract may be incorporated in 300 parts of water. One part of this mixture may then be dissolved in a convenient quantity of water and will be sufficient for the treatment of about 500 volumes of mud. For instance, a Pierce Junction field (Harris County, Texas) mud, which is composed of surface clays and cuttings from the "Jackson" shale formation (which contains considerable colloidal matter) and which, before treatment, had a viscosity of 58 centipoises, was treated with the above mixture in the proportions of 1 volume of the mixture to 500 volumes of mud, and its viscosity was thereby reduced to 10 centipoises.

EXAMPLE 5

Various complex silicates containing a polyvalent metal cation derived from an amphoteric metal such as aluminum, tin, or other metal yielding a mixed silicate that is soluble in water at least to the extent necessary for the production of colloidal aqueous suspensions, are also valuable degelling agents. As a specific example, a drilling fluid prepared from Wyoming bentonite and water and having an initial viscosity of 35 centipoises in a Stormer viscosimeter at 600 R. P. M. was treated in varying proportions with a colloidally soluble sodium alumino-silicate prepared as follows:

100 grams of Wyoming bentonite were stirred into 100 grams of 20% caustic soda solution. The mass was boiled to evaporate the water, and after evaporating to dryness the mass was melted in a muffle furnace at white heat, and then poured out on an iron slab to cool and solidify. The glassy sodium alumino-silicate was pulverized, ground to an impalpable powder, and dissolved in water as a 10% colloidal suspension. 1.0 ml. of the aqueous suspension was added to a 200 ml. sample of the drilling fluid and thoroughly mixed by shaking the sample for one minute. The viscosity was reduced from 35 centipoises to 21 centipoises.

EXAMPLE 6

A soluble sodium alumino-silicate was prepared by stirring 20 grams of Wyoming bentonite into a solution of 20 grams of anhydrous sodium orthosilicate, $Na_4SiO_4$, in 20 grams of water. The fairly thin suspension was evaporated to dryness and fused to a molten liquid in a muffle furnace. The "glass" prepared by cooling the melt was pulverized, ground to an impalpable powder, and dissolved in water as a 10% colloidal suspension. 1.0 ml. of the aqueous suspension was added to a 200 ml. sample of the drilling fluid in the manner described in Example 5. The viscosity of the drilling fluid was reduced from 35 centipoises to 20 centipoises.

EXAMPLE 7

Ultramarine is a blue inorganic dye prepared by fusion of clay, soda, sulfur, and wood charcoal. It consists of a sodium aluminum silicate in a complex with sodium polysulfides. It may be prepared in colloidal aqueous suspensions. 200 ml. of a Wyoming bentonite drilling fluid were treated with 0.4 ml. of a 10% aqueous suspension of ultramarine. The initial viscosity of 35 centipoises was reduced to 23 centipoises.

EXAMPLE 8

The water soluble alkali-metal or ammonium stannates are suitable degelling agents, especially when used in conjunction with a lyophile colloid.

As an example thereof, a drilling fluid was prepared containing 8 per cent of Wyoming bentonite by weight. The initial viscosity was 33 centipoises. A 200 ml. sample of this drilling fluid was treated with 0.04 g. of sodium stannate, $Na_2SnO_3.3H_2O$, as a 10 per cent aqueous solution. The viscosity was reduced to 25 centipoises.

To another 200 ml. sample of the same drilling fluid were added 0.04 g. of sodium stannate and 0.2 g. of dry chestnut extract (66% tannins) in concentrated aqueous solution. The viscosity was reduced to 19 centipoises.

The employment of alkali-metal stannates is further described and claimed in application Serial Number 50,016, filed September 20, 1948.

EXAMPLE 9

The poly-phosphates, including the meta-, and pyro-derivatives derivable from the simpler phosphates are the most suitable inorganic degelling agents for my purpose, cost, efficiency, availability, and ease of handling, considered. They are also the most useful members of group V which also includes several of the other more valuable degelling agents derivable from the acidic oxides of vanadium, arsenic, and antimony. The employment of polyphosphates is further described and claimed in my Patents Nos. 2,294,877, 2,331,279, 2,334,051, and 2,386,794, and the employment of esters of polyphosphoric acid are described and claimed in my Patents Nos. 2,216,865, and 2,331,282.

Table V contains data obtained in the usual manner from the treatment of a drilling fluid prepared from Wyoming bentonite, and containing 8 per cent of solids.

TABLE V

| Phosphate Tested | Viscosity in Centipoises at Various Ratios (Grams of phosphate per 100 ml. of Fluid) | | | | |
| --- | --- | --- | --- | --- | --- |
| | 0.02 | 0.04 | 0.10 | 0.20 | 0.40 |
| Original Fluid (Untreated) | 48 | 48 | 48 | 48 | 48 |
| $NaH_2PO_4$, anhydrous | 44 | 38 | 33 | 29 | 25 |
| $Na_2HPO_4$, anhydrous | 44 | 39 | 33 | 28 | 25 |
| $Na_2H_2P_2O_7$, anhydrous | 35 | 29 | 23 | 17 | 15 |
| $Na_4P_2O_7$, anhydrous | 35 | 29 | 23 | 19 | 15 |
| $(NaPO_3)_6$, hexameta, anhyd | 33 | 28 | 23 | 21 | 17 |
| $Na_5P_3O_{10}$, tetra, anhyd | 35 | 31 | 28 | 25 | 19 |
| $Na_6P_4O_{13}$, hexa, anhyd | 33 | 29 | 28 | 23 | 17 |
| $Na_{27}P_{25}O_{76}$, high-poly, anhyd | 35 | 29 | 28 | 21 | 17 |

The marked superiority of the polyphosphates over the orthophosphates is clearly shown in the tabulated data, also the similar results which may be expected from the use of the various polyphosphates. Evidently, a polyphosphate radical is specific in its action on the gel-forming colloids of earthy drilling fluid suspensions. However, as disclosed in my co-pending application, Serial No. 24,083, filed May 29, 1935, highly satisfactory results are obtainable from the use of an orthophosphate in connection with a lyophile colloid, and preferably, also, with a buffer substance.

EXAMPLE 10

Sodium silico phosphate was prepared by fusion of a dry mixture of sodium carbonate, fine amorphous silica, and powdered phosphorous pentoxide in the proportions necessary to fusion product of the formula, $3Na_2O.SiO_2.P_2O_5$. The product was dissolved in water and used as a 10% solution in the treatment of an 8 per cent Wyoming bentonite drilling fluid having an initial viscosity of 35 centipoises. Treatment in the proportion of 0.02 g. of sodium silico phosphate per 100 ml. of drilling fluid reduced the viscosity to 23 centipoises. Another sample of the same drilling fluid was treated in the proportion of 0.10 g. of sodium silico phosphate per 100 ml. of drilling fluid, and the initial viscosity of 35 centipoises was reduced to 17 centipoises.

The employment of crystalline alkali-metal silicates is further described and claimed in application Serial Number 50,015, filed September 20, 1948.

EXAMPLE 11

The arsenates are another member of group V possessing satisfactory degelling properties. They preferably are derived from the pentoxide, $As_2O_5$, in manner analogous to the preparation of phosphates from phosphorus pentoxide, $P_2O_5$.

Polyarsenates may likewise be prepared as arsenate fusions or "glasses."

Tests were run with anhydrous disodium monohydrogen arsenate as compared with tetrasodium pyroarsenate, prepared by fusion of disodium monohydrogen orthoarsenate, using an 8 per cent Wyoming bentonite fluid which had been prepared with hot water, and was therefore partially coagulated and of high viscosity. Results are shown in Table VI, expressed as centipoises by determination in a Stormer viscosimeter at 600 R. P. M.

TABLE VI

| Grams Arsenate per 100 ml. | Viscosity in Centipoises | |
|---|---|---|
| | $Na_2HAsO_4$ | $Na_4As_2O_7$ |
| None (untreated fluid) | 51 | 51 |
| 0.05 | 43 | 42 |
| 0.10 | 39 | 39 |
| 0.20 | 35 | 31 |
| 0.40 | 29 | 27 |

EXAMPLE 12

The ortho-arsenates are more valuable as degelling agents when used with a lyophile colloid. As a specific example, several samples of the same drilling fluid described under Example 6 were treated with disodium monohydrogen arsenate in the proportion of 0.40 g. per 100 ml. of drilling fluid together with varying proportions of dry chestnut tannin of 66% tannin content. The results are shown in Table VII.

TABLE VII

| Chestnut Extract (Grams per 100 ml.) | Viscosity in Centipoises (0.40 g. of $Na_2HAsO_4$) |
|---|---|
| None (Arsenate only) | 29 |
| 0.10 | 25 |
| 0.20 | 23 |
| 0.40 | 19 |

The increased efficiency of the arsenate-tannin mixtures is comparable to the increased efficiency of orthophosphates when used with lyophile colloids, as described in my co-pending application, Serial No. 24,083, filed May 29, 1935.

The employment of alkali-metal arsenates is further described and claimed in application Serial Number 50,017, filed September 20, 1948.

EXAMPLE 13

Another member of group V whose acidic oxides yield valuable oxy-acids and oxy-acid salts, alkali-metal salt polymers, or "glasses", and other complexes, is the element vanadium. Like phosphorus, it yields a pentoxide, $V_2O_5$, which is the anhydride of ortho-, meta-, and pyro-vanadic acids. The efficiency of its salts as degelling agents closely resembles the phosphates, but owing to their present cost, the phosphates and complex phosphate polymers are presently preferred.

Table VIII contains data obtained from various vanadates used in the treatment of an 8 per cent Wyoming bentonite fluid having an initial viscosity of 39 centipoises. This table compares the effectiveness of the poly-vanadates to the ortho-vanadates.

TABLE VIII

| Vanadate Tested | Viscosity in Centipoises at Various Ratios (Grams of vanadate per 100 ml. of Fluid) | | | | |
|---|---|---|---|---|---|
| | 0.02 | 0.05 | 0.10 | 0.20 | 0.40 |
| None (Untreated Fluid) | 39 | 39 | 39 | 39 | 39 |
| Trisodium Vanadate, ortho | 29 | 27 | 25 | 19 | 17 |
| Sodium Mono-vanadate, meta | 29 | 25 | 23 | 19 | 17 |
| Sodium tetra-vanadate | 19 | 18 | 15 | 13 | |

EXAMPLE 14

The members of group VI whose highest oxide has the formula $(MO_3)$ are generally of less value than members of group V. However, their oxy-acid derivatives do possess appreciable degelling properties when combined with a phosphate radical in a complex acid or salt.

Table IX contains data on the degelling effects of various molybdates and tungstates, and certain phosphate complexes in which are combined phosphate radicals together with radicals from derivatives of the type $MO_3$ acidic oxides of group VI. The tests were run on a freshly prepared Wyoming bentonite suspension containing 8 per cent of solids by weight. The results are expressed as centipoises, and were determined in the manner previously described.

TABLE IX

| Material Tested | Viscosity in Centipoises at Various Ratios (Grams of $MO_3$ derivative per 100 ml. of fluid) | | | |
|---|---|---|---|---|
| | 0.02 | 0.05 | 0.10 | 0.20 |
| Original Fluid (Untreated) | 30 | 30 | 30 | 30 |
| Sodium molybdate, tetra | 25 | 23 | 25 | 25 |
| Sodium tungstate, pyro | 25 | 23 | 25 | 25 |
| Sodium phospho-molybdate [1] | 25 | 23 | 23 | 23 |
| Sodium phospho-tungstate [1] | 25 | 25 | 21 | 19 |

[1] Reagent grade. See following table for complex Mo and W phosphate "glasses."

Various complexes embodying a polyphosphate radical are valuable degelling agents for my process. These complexes, prepared as fused "glasses," embody a polyphosphate radical in association with a radical or radicals selected from groups III to VI, inclusive, of the periodic system. The latter radicals, themselves, or as polymers thereof, may possess degelling properties, but the complexes embodying one or more of them in association with a polyphosphate radical are highly efficient, comparing most favorably with the alkali-metal polyphosphates. The specific value of a polyphosphate radical in the degelling of well drilling fluids is thus again demonstrated. These facts are illustrated in the following additional examples.

EXAMPLE 15

Commercial sodium borophosphate, obtained from the Glyco Products Company, of New York city, were obtained and tested on a Wyoming bentonite drilling fluid containing 8 per cent of solids and having an original viscosity of 39 centipoises. Data are shown in Table X.

TABLE X

| Material Tested | Viscosity in Centipoises at Various Ratios (Grams of Sodium Borophosphate per 100 ml. of fluid) | | | |
|---|---|---|---|---|
| | 0.05 | 0.10 | 0.20 | 0.40 |
| Original fluid (Untreated) | 39 | 39 | 39 | 39 |
| Glyco Abopon Special, powd | 36 | 31 | 29 | 25 |
| Glyco Stacol #1526, glassy | 36 | 31 | 28 | 23 |

EXAMPLE 16

A sodium (poly) phospho-vanadate glass was prepared by fusing 14.2 g. (0.1 mol) of $Na_2HPO_4$, anhydrous, with 10.0 g. (0.1 mol) of technical metavanadic acid at bright redness in a muffle furnace. The liquid melt was then poured out on a cooled iron slab to form a "glass." The product was a dark, brownish-green glass, soluble in water, and of hygroscopic nature. A 10 per cent aqueous solution was used in treating several samples of a freshly prepared 8 per cent Wyoming bentonite drilling fluid, each in a different proportion of degelling agent to drilling fluid. The data are included in Table XI.

EXAMPLE 17

A sodium (poly) phospho-molybdate "glass" was prepared by fusing 14.2 g. (0.10 mol) of anhydrous $Na_2HPO_4$ with 16.5 g. (0.10 mol) of molybdic acid ($H_2MoO_4$), and cooling the liquid melt as described in Example 16. Aqueous solutions of the dark red "glass" are green in color. The glass thus produced was tested in the manner described in Example 16, and the data are recorded in Table XI.

EXAMPLE 18

A sodium (poly) phospho-tungstate "glass" of yellowish green color was prepared from 14.2 g. of anhydrous $Na_2HPO_4$ and 25.0 g. of tungstic acid, ($H_2WO_4$), in the manner previously described in Examples 16 and 17. The material is very hard and flint-like in texture, and although fully soluble in water, it may be necessary to grind it to a fine powder and dissolve it with the aid of heat. Since polyphosphates are known to revert to simpler forms in hot aqueous solutions, the method used in dissolving this material may account for its somewhat lower efficiency indicated in Table XI, as compared with the other complexes shown. Otherwise, the method of testing was identical with Examples 16 and 17.

TABLE XI

| Material Tested | Viscosity in Centipoises at Various Ratios (Grams of "glass" per 100 ml. of fluid) | | | |
|---|---|---|---|---|
| | 0.02 | 0.05 | 0.10 | 0.20 |
| Original Fluid (Untreated) | 30 | 30 | 30 | 30 |
| Sodium phospho-vanadate (Example 16) | 19 | 18 | 15 | 11 |
| Sodium phospho-molybdate (Example 17) | 19 | 18 | 15 | 13 |
| Sodium phospho-tungstate (Example 18) | 23 | 19 | 18 | 15 |

The "glassy" sodium phospho-molybdates and sodium phospho-tungstates are doubtless more highly polymerized than the reagent forms tested in Example 14, and recorded in Table IX. The same 8 per cent Wyoming bentonite drilling fluid was used in testing the products described in Examples 14, 16, 17 and 18.

Other phosphate complexes embodying oxy-radicals derived from Fe, Al, Cr, Sb, Sn, and others, are likewise contemplated. As previously indicated, I prefer those derived from elements whose oxides are acidic and yield water-soluble oxy-acids. In all cases, however, it appears that a phosphate or vanadate radical should preferably be present in such complexes to obtain the maximum degelling effects. Similar arsenate complexes are analogous to those embodying phosphate radicals. In all instances, it is preferred that a radical from group V be present, and preferably it should be selected from Examples 9, 10, 11 and 13.

The oxy-acids, normal salts, acid salts, polymers, and complexes of the above disclosures may be used alone, or in connection with lyophile colloids, buffer substances, alkalies, and the like. The poly-compounds and complex "glasses," generally, do not appear to be greatly improved by the addition of such substances, although the efficiencies of the phosphates, vanadates, and arsenates are usually enhanced by their presence, as is that of the poly-borates.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. Such proportions are noted in the tests above as ranging from 0.02 to 0.40 gram per 100 milliliters that is 0.2%–0.40% as related to the drilling fluid. Where water is employed to thin or reduce the viscosity of a drilling fluid, comparatively large percentages of water as related to the drilling fluid are required to effect such result. In the treatment of a drilling fluid with a chemical agent or compound, however, comparatively small percentages are required to secure comparable results. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatment with my improved treating agent to produce normal viscosities for muds so contaminated.

While in the foregoing, theories are advanced, these are put forward to facilitate the understanding of the objects and purposes of this invention; it is to be understood, however, that this

13 invention is not dependent upon or limited to any theory put forward.

What is claimed is:

1. An aqueous well drilling fluid containing a gel-forming constituent and a small percentage of a degelling poly-derivative of at least one water-soluble derivative of a normally solid acidic oxide as herein defined, of an element of one of the groups III, IV, V and VI of the periodic system.

2. An aqueous well drilling fluid containing a gel-forming constituent and a small percentage of a degelling poly-derivative of at least one water-soluble derivative of a normally solid acidic oxide as herein defined, from the group consisting of $M_2O_3$, $MO_2$, $M_2O_5$ and $MO_3$ and in which M is an element of one of the groups III, IV, V and VI of the periodic system.

3. An aqueous well drilling fluid containing a gel-forming constituent and a small percentage of a degelling product derived from the dehydration of at least one derivative of a normally solid acidic oxide as herein defined, of the type $M_2O_5$ in which M is an element of group V of the periodic system.

4. An aqueous well drilling fluid containing a gel-forming constituent and a small percentage of a degelling poly-derivative of an acidic oxide as herein defined, of an element of group V of the periodic system consisting of phosphorus, vanadium, arsenic, columbium, antimony and tantalum.

5. An aqueous well drilling fluid containing a gel-forming constituent and a small percentage of a degelling water-soluble polyarsenic acid compound.

6. An aqueous well drilling fluid containing a gel-forming constituent and a small percentage of a degelling water-soluble polyboric acid compound.

7. In the art of drilling wells by the employment of an aqueous mud-laden drilling fluid, the process comprising, adding to the drilling fluid a small percentage of a degelling poly-derivative of at least one water-soluble derivative of a normally solid acidic oxide as herein defined, of an element of one of the groups III, IV, V and VI of the periodic system.

8. In the art of drilling wells by the employment of an aqueous mud-laden drilling fluid, the process comprising, adding to the drilling fluid a small percentage of a degelling poly-derivative of at least one water-soluble derivative of a normally solid acidic oxide as herein defined, from the group consisting of $M_2O_3$, $MO_2$, $M_2O_5$ and $MO_3$ and in which M is an element of one of the groups III, IV, V and VI of the periodic system.

9. In the art of drilling wells by the employment of an aqueous mud-laden drilling fluid, the process comprising, adding to the drilling fluid a small percentage of a degelling product derived from the dehydration of at least one derivative of a normally solid acidic oxide as herein defined, of the type $M_2O_5$ in which M is an element of group V of the periodic system.

10. A well-drilling-fluid treating-composition which is a concentrate consisting essentially of the following active ingredients, viz.: a degelling water-dispersible poly-derivative of at least one water-soluble derivative of a normally solid acidic oxide as herein defined, of an element of one of the groups III, IV, V and VI of the periodic system, together with a lyophile colloid.

11. A well-drilling-fluid treating-composition which is a concentrate consisting essentially of the following active ingredients, viz.: a degelling water-dispersible poly-derivative of at least one water-soluble derivative of a normally solid acidic oxide as herein defined, from the group consisting of $M_2O_3$, $MO_2$, $M_2O_5$, and $MO_3$ and in which M is an element of one of the groups III, IV, V and VI of the periodic system, together with a lyophile colloid.

12. A well-drilling-fluid treating-composition which is a concentrate consisting essentially of the following active ingredients, viz.: a degelling water-dispersible product derived from the dehydration of at least one derivative of a normally solid acidic oxide as herein defined, of the type $M_2O_5$ in which M is an element of group V of the periodic system, together with a lyophile colloid.

TRUMAN B. WAYNE.

REFERENCES CITED

The following references are of record in the file of this patent:

UNITED STATES PATENTS

| Number | Name | Date |
|---|---|---|
| 1,001,413 | Keppeler | Aug. 22, 1911 |
| 1,438,588 | Feldenheimer | Dec. 12, 1922 |
| 1,728,662 | Chwala | Sept. 17, 1929 |
| 1,903,041 | Hall et al. | Mar. 28, 1933 |
| 1,929,172 | King | Oct. 3, 1933 |
| 1,943,532 | Howe | Jan. 16, 1934 |
| 1,999,766 | Lawton et al. | Apr. 30, 1935 |
| 2,012,232 | Kline et al. | Aug. 20, 1935 |
| 2,085,517 | Van Campen | June 29, 1937 |
| 2,110,363 | Howells et al. | Mar. 8, 1938 |
| 2,160,949 | Williams | June 6, 1939 |
| 2,235,955 | Williams | Mar. 25, 1941 |
| 2,292,267 | Garrison | Aug. 4, 1942 |
| 2,294,877 | Wayne | Sept. 1, 1942 |

FOREIGN PATENTS

| Number | Country | Date |
|---|---|---|
| 819,749 | France | July 12, 1937 |

OTHER REFERENCES

Petroleum—Zeitschrift, Issue No. 44 of Nov. 2, 1932, pages 7 and 8.

The Petroleum Times, March 3, 1934, page 225.